(12) United States Patent
Narendra

(10) Patent No.: US 12,327,371 B2
(45) Date of Patent: Jun. 10, 2025

(54) AUTOMATIC TRAINING DATA SAMPLE COLLECTION

(71) Applicant: ZEBRA TECHNOLOGIES CORPORATION, Lincolnshire, IL (US)

(72) Inventor: Patrenahalli M. Narendra, Hoffman Estates, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 744 days.

(21) Appl. No.: 17/514,967

(22) Filed: Oct. 29, 2021

(65) Prior Publication Data
US 2023/0139490 A1 May 4, 2023

(51) Int. Cl.
*G06T 7/73* (2017.01)
*G06F 18/2411* (2023.01)
*G06V 10/20* (2022.01)
*G06V 20/20* (2022.01)

(52) U.S. Cl.
CPC ............ *G06T 7/73* (2017.01); *G06F 18/2411* (2023.01); *G06V 10/255* (2022.01); *G06V 20/20* (2022.01); *G06T 2207/20081* (2013.01)

(58) Field of Classification Search
CPC ............ G06T 7/73; G06T 2207/20081; G06T 2207/30232; G06T 2207/30241; G06T 7/246; G06F 18/2411; G06V 10/255; G06V 20/20; G06V 10/774; G06V 20/10
See application file for complete search history.

(56) References Cited

U.S. PATENT DOCUMENTS

| | | | | |
|---|---|---|---|---|
| 10,518,973 | B2* | 12/2019 | Hance | B25J 5/007 |
| 11,367,043 | B2* | 6/2022 | Jacobus | G05D 1/249 |
| 11,783,606 | B2* | 10/2023 | Jackson | G06V 20/20 |
| | | | | 382/177 |
| 11,823,440 | B2* | 11/2023 | Brown | G06V 10/82 |
| 2017/0225891 | A1* | 8/2017 | Elazary | G05D 1/0234 |
| 2017/0278047 | A1* | 9/2017 | Welty | G05D 1/0011 |
| 2018/0088586 | A1* | 3/2018 | Hance | G06Q 10/08 |

OTHER PUBLICATIONS

Brownlee, J. (Dec. 9, 2020). Autoencoder Feature Extraction for Regression. Machine Learning Mastery. Retrieved Aug. 22, 2023, from https://machinelearningmastery.com/autoencoder-for-regression/.

* cited by examiner

*Primary Examiner* — Tom Y Lu

(57) ABSTRACT

A method in a mobile computing device includes: controlling a camera to capture an image; tracking a pose of the mobile computing device, corresponding to the image, in a coordinate system; detecting an item in the image; determining a location of the detected item in the coordinate system, based on the tracked pose; obtaining an item identifier corresponding to the detected item, based on the location of the detected item in the coordinate system; generating a training data sample including (i) a payload based on the detected item, and (ii) a label including the obtained item identifier; and storing the training data sample.

23 Claims, 7 Drawing Sheets

AUTOMATIC TRAINING DATA SAMPLE COLLECTION

BACKGROUND

Machine vision technologies may be employed to detect items in images collected in environments such as retail facilities. The deployment of such technologies may involve time-consuming collection of large volumes of training data, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
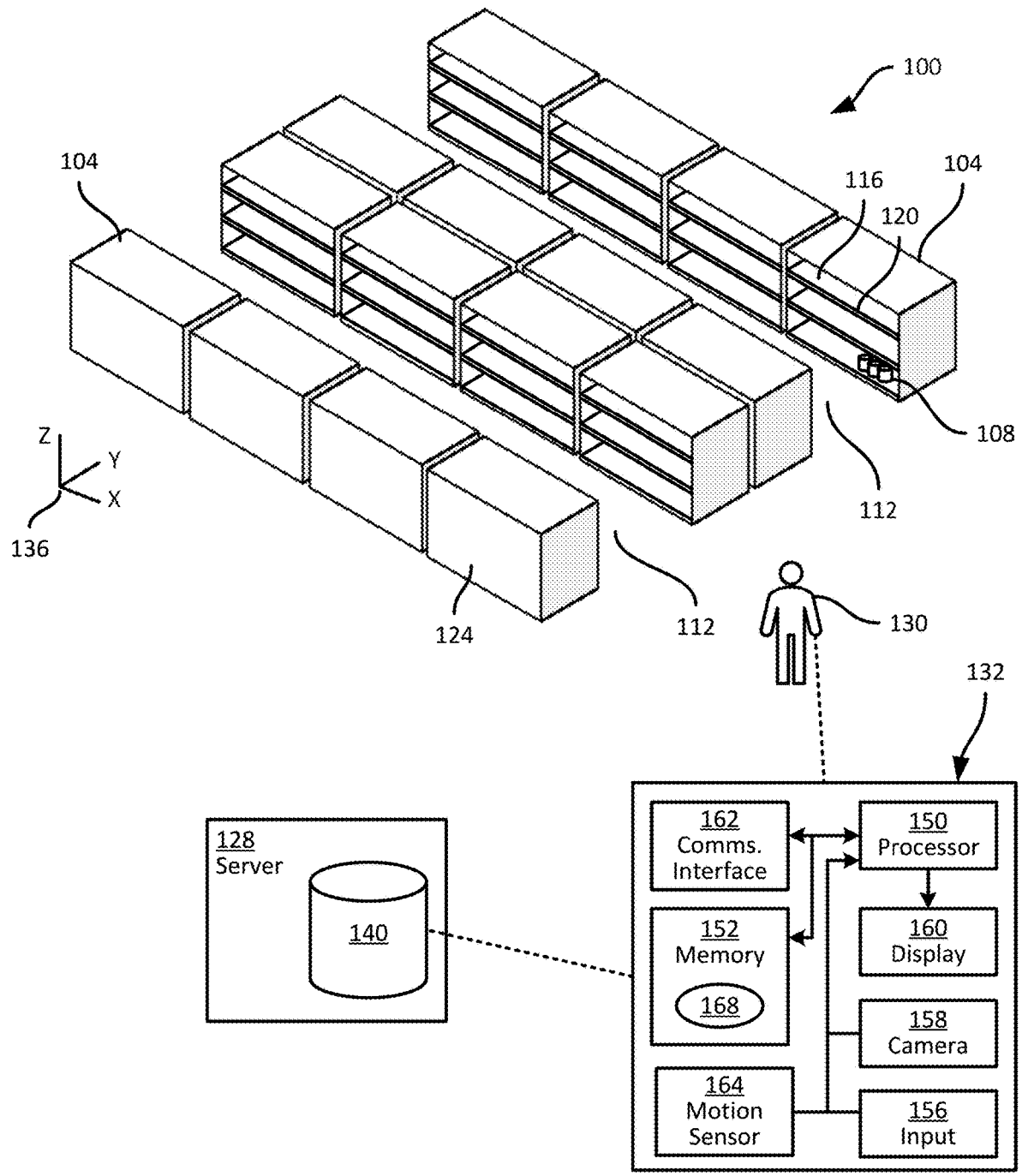
FIG. 1 is a diagram of a facility containing a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a mobile computing device, the method comprising: controlling a camera to capture an image; tracking a pose of the mobile computing device, corresponding to the image, in a coordinate system; detecting an item in the image; determining a location of the detected item in the coordinate system, based on the tracked pose; obtaining an item identifier corresponding to the detected item, based on the location of the detected item in the coordinate system; generating a training data sample including (i) a payload based on the detected item, and (ii) a label including the obtained item identifier; and storing the training data sample.

Additional examples disclosed herein are directed to a mobile computing device, comprising: a camera; a memory; and a processor configured to: control the camera to capture an image; track a pose of the mobile computing device, corresponding to the image, in a coordinate system; detect an item in the image; determine a location of the detected item in the coordinate system, based on the tracked pose; obtain an item identifier corresponding to the detected item, based on the location of the detected item in the coordinate system; generate a training data sample including (i) a payload based on the detected item, and (ii) a label including the obtained item identifier; and store the training data sample.

Further examples disclosed herein are directed to a non-transitory computer-readable medium storing computer-readable instructions executable by a processor of a mobile computing device to: control a camera to capture an image; track a pose of the mobile computing device, corresponding to the image, in a coordinate system; detect an item in the image; determine a location of the detected item in the coordinate system, based on the tracked pose; obtain an item identifier corresponding to the detected item, based on the location of the detected item in the coordinate system; generate a training data sample including (i) a payload based on the detected item and (ii) a label including the obtained item identifier; and store the training data sample.

FIG. 1 illustrates an interior of a facility, such as a retail facility (e.g., a grocer). In other examples, the facility 100 can be a warehouse, a healthcare facility, a manufacturing facility, or the like. The facility 100 includes a plurality of support structures 104, such as shelf modules, carrying items 108. In the illustrated example, the support structures 104 are arranged in sets forming aisles 112. FIG. 1, specifically, illustrates two aisles 112 each formed by eight support structures 104. The facility 100 can have a wide variety of layouts other than the example layout shown in FIG. 1.

The support structures 104 include support surfaces 116, such as shelves, pegboards, and the like, to support the items 108 thereon. The support surfaces 116, in some examples, terminate in shelf edges 120, which face into the corresponding aisle 112. A shelf edge 120, as will be apparent to those skilled in the art, is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

The support surfaces 116 carry the items 108, which can include products for retrieval by customers, workers and the like in the facility. As seen in FIG. 1, the support surfaces 116 are accessible from the aisle 112 into which the shelf edges 120 face. In some examples, each support structure 104 has a back wall 124 rendering the support surfaces 116 inaccessible from the side of the support structure 104 opposite the shelf edges 120. In other examples, however, the support structure 104 can be open from both sides (e.g., the back wall 124 can be omitted).

As will be apparent, the facility 100 may contain a wide variety of items 108 disposed on the support structures 104. For instance, a retail facility such as a grocer may contain tens of thousands of distinct products. Activity within the facility 100, such as removal of items 108 from the support structures 104 by customers, workers filling orders, and the like, can lead to certain items 108 being depleted (i.e., low stock, or out of stock) from the support structures 104. In some instances, items 108 may be misplaced on the support structures 104, e.g., by a customer. Detection and remediation of the above conditions, e.g., by restocking an item 108 from inventory in a back room, relocating a misplaced item 108 to the correct position, and the like, may be time-consuming tasks.

In some systems, the detection of item status information such as a low stock status, an out of stock status, a plug status (i.e., a misplaced item 108), and the like, can be at least partially automated. Automation of such detection can be performed by collecting images of the support structures 104 and the items 108 thereon, e.g., from fixed cameras deployed in the facility, and/or from cameras disposed on mobile devices deployed within the facility. Such images can then be processed, e.g., at a server 128, to detect individual items 108 therein and determine item status information.

The detection of items 108 within images as mentioned above can be implemented according to various recognition mechanisms, such as machine-learning based classifiers (e.g., "You Only Look Once" or YOLO). Deployment of such recognition mechanisms, as will be apparent to those skilled in the art, may involve collecting a set of training data and executing a training process to set parameters of the recognition mechanism. The training data can include, for example, a number of images (e.g., several hundred in some cases) of each item type. Each image, also referred to as a sample, is also labeled with an identifier of the item type depicted. The identifier can include a universal product code (UPC), a brand name and/or product name, and the like. The training process mentioned above involves processing the samples to identify image features that indicate the likely presence in an image of a particular item 108.

As will now be apparent, the collection of a training data set that includes hundreds or more of images, for each item type among of thousands or more of distinct item types, may be a prohibitively time-consuming task. The performance of the recognition mechanism may also be improved by using a training set composed of images captured under conditions (e.g., lighting, imaging distance, and the like) similar to those in the facility 100 itself, which may further complicate collection of a set of training data.

Certain computing devices are also deployed in the facility 100 to perform, or assist in performing, various tasks related to managing item inventory. As will be discussed below in greater detail, such computing devices can implement additional functionality to facilitate at least partial automation of the collection of training data samples for use in training recognition mechanisms.

In particular, a worker 130 in the facility can be equipped with a mobile computing device 132, also referred to simply as a device 132. The device 132 can be a tablet computer, a smart phone, a wearable computer (e.g., smart glasses), or the like. The device 132 can implement functionality to assist the worker 130 in completing various tasks in the facility 100. An example of such tasks includes a pick task, in which the worker 130 retrieves specific items 108 from support structures, e.g., to fill an online order received from a customer of the facility 100. Various other tasks will also occur to those skilled in the art.

The functionality implemented by the device 132 in connection with a pick task can include receiving (e.g., from the server 128) a list of item identifiers to be picked, and/or presenting directional guidance to the worker 130 indicating locations of such items in the facility 100. When a given item 108 is picked from a support structure 104 according to guidance provided by the device 132, the worker 130 may control the device 132 to scan a barcode associated with the picked item 108. The barcode may appear on a label associated with the item 108, e.g., affixed to a shelf edge 120. Scanning of the barcode can provide confirmation that the item 108 has been picked, and thereby enable the device 132 to track progress of the pick task.

As will be apparent, therefore, the device 132 travels throughout the facility 100 while tasks such as picking are performed. In other examples, the device 132 can be implemented as part of a mobile apparatus that is autonomous or semi-autonomous, rather than as a portable device carried by the worker 130 as noted above. Further, the device 132 includes components enabling the capture of images. As discussed below, the device 132 is configured to capture and process images, e.g., during the performance of other tasks by the worker 130, to automatically generate training data samples for use by the server 128 in training recognition mechanisms.

Processing of the images by the device 132 to support automated generation of training data samples includes tracking a pose (i.e., a position and orientation) of the device 132 within the facility 100, e.g., according to a previously established coordinate system 136. The tracked pose can then be employed to determine locations (i.e., also within the coordinate system 136) of items 108 identified within images captured by the device 132. The device 132 can then retrieve item identifiers expected to appear at the relevant locations, e.g., from a repository 140 at the server 128 such as a planogram or realogram. The repository 140, in other words, specifies locations of each item type 108 in the facility 100, and may include additional information for each item type, such as pricing information and the like. The device 132 can also implement additional functionality to guard against the generation of training sample data from images of misplaced items, which may not conform to the expected item arrangement specified in the repository 140.

Certain internal components of the device 132 are illustrated in FIG. 1. In particular, the device 132 includes a special-purpose controller, such as a processor 150, interconnected with a non-transitory computer readable storage medium, such as a memory 152. The memory 152 includes a combination of volatile memory (e.g., Random Access Memory or RAM) and non-volatile memory (e.g., read only memory or ROM, Electrically Erasable Programmable Read Only Memory or EEPROM, flash memory). The processor 150 and the memory 152 each comprise one or more integrated circuits.

The device 132 also includes at least one input device 156 interconnected with the processor 150. The input device 156 is configured to receive input and provide data representative of the received input to the processor 150. The input device 156 includes any one of, or a suitable combination of, a touch screen, a keypad, a trigger button, a microphone, and the like. In addition, the device 132 includes a camera 158 including a suitable image sensor or combination of image sensors. The camera 158 is controllable by the processor 150 to capture images (e.g., single frames or video streams including sequences of image frames). The camera 158 can include either or both of a two-dimensional camera, and a three-dimensional camera such as a stereo camera assembly, a time-of-flight camera, or the like. In other words, the camera 158 can be enabled to capture either or both of color data (e.g., values for a set of color channels) and depth data.

The device 132 also includes a display 160 (e.g., a flat-panel display integrated with the above-mentioned touch screen) interconnected with the processor 150, and configured to render data under the control of the processor

150. The client device 132 can also include one or more output devices in addition to the display 160, such as a speaker, a notification LED, and the like (not shown).

The device 132 also includes a communications interface 162 interconnected with the processor 150. The communications interface 162 includes any suitable hardware (e.g., transmitters, receivers, network interface controllers and the like) allowing the client device 132 to communicate with other computing devices via wired and/or wireless links (e.g., over local or wide-area networks). The specific components of the communications interface 162 are selected based on the type(s) of network(s) or other links that the device 132 is required to communicate over.

Further, the device 132 includes a motion sensor 164, such as an inertial measurement unit (IMU) including one or more accelerometers, one or more gyroscopes, and/or one or more magnetometers. The motion sensor 164 is configured to generate data indicating detected movement of the device 132 and provide the data to the processor 150, for example to enable the processor 150 to perform the pose tracking mentioned earlier.

The memory 152 stores computer readable instructions for execution by the processor 150. In particular, the memory 152 stores a training data generator application 168 (also referred to simply as the application 168) which, when executed by the processor 150, configures the processor 150 to perform various functions discussed below in greater detail and related to the capture of images of items 108 and generation of training sample data therefrom. The application 168 may also be implemented as a suite of distinct applications in other examples. Those skilled in the art will appreciate that the functionality implemented by the processor 150 via the execution of the application 168 may also be implemented by one or more specially designed hardware and firmware components, such as FPGAs, ASICs and the like in other embodiments.

As will be apparent, the memory 152 can also store various other applications, such as picking application or the like, enabling the device 132 to provide directional and/or task guidance to the worker 130. Such other applications can be executed simultaneously with the application 168, enabling the device 132 to automatically generate training sample data during the performance of other tasks, e.g., reducing or eliminating a need for the worker 130 to perform additional actions (extending beyond the actions involved in complete pick tasks or the like) specifically to generate training data.

Figure 2:
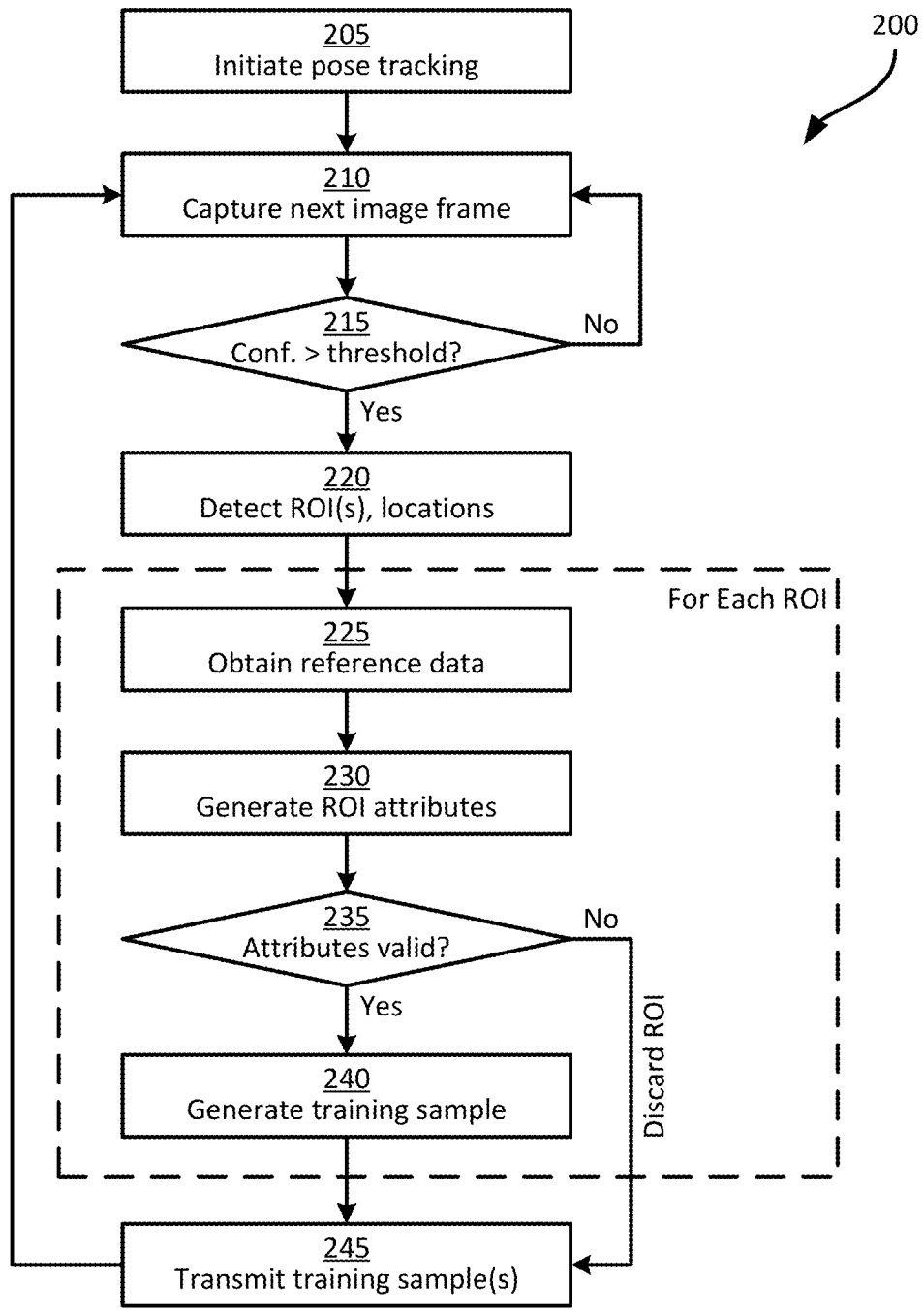
FIG. 2 is a flowchart of a method of image-based item recognition.

Turning to FIG. 2, a method 200 of generating training data is shown. The method 200 will be discussed below in conjunction with its performance by the device 132. As will be apparent, multiple devices 132 may be deployed in the facility 100, and each device 132 can perform a separate instance of the method 200. Further, devices 132 deployed in distinct facilities 100 (e.g., operated by a common entity) can perform separate instances of the method 200, and the results of each performance of the method 200, across multiple devices 132 in each of multiple facilities 100, can be combined to form a set of training data.

At block 205, the device 132 is configured to initiate pose tracking. Initiation of pose tracking at block 205 occurs in response to execution of the application 168, or another application stored in the memory 152. For example, the processor 150 can be configured to perform block 205 by initiating execution of the application 168 upon detecting execution of another predefined application, such as a picking application.

Pose tracking can involve initiation of a local coordinate system, created by the device 132 arbitrarily (e.g., without a predetermined relationship to the facility coordinate system 136). The local coordinate system can then be registered to the facility coordinate system 136 according to various mechanisms, such as the imaging of predetermined anchor features in the facility 100, and/or the detection of wireless signals from beacons, access points and the like with predetermined locations in the facility 100.

Pose tracking involves capturing a sequence of images using the camera 158 and tracking the positions of features (e.g., surfaces, edges, corners, and the like) in the sequence. The positions of such features throughout the sequence of images, combined with data from the motion sensor 164, are used to track movement of the device 132, e.g., in six degrees of freedom. More specifically, the device 132 is configured to generate a sequence of poses of the device 132 in the local coordinate system, which are then transformed into the facility coordinate system 136.

Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc. Pose tracking, once initiated at block 205, continues throughout the remainder of the method 200. The frequency with which new pose estimates are generated by the device 132 varies, for example with the computational resources available to the device 132, the frame rate of the camera 158, and the like. For example, the device 132 may generate pose estimates at a frequency of about 30 Hz, although higher and lower frequencies are also contemplated.

At block 210, the device 132 is configured to capture an image, e.g., as a single frame or as part of a sequence of images. In some examples, the device 132 initiates the capture of a sequence of images at block 205 for use in pose tracking. Therefore, at block 210, no additional image capture is necessary. Instead, at block 210 in such implementations the device 132 can be configured to select a particular image from the above-mentioned sequence for additional processing. In other examples, pose tracking may be performed without images, in which case the device 132 is configured to control the camera 158 to capture an image at block 210.

The selection of an image from a sequence whose capture was previously initiated, or the capture of an image, at block 210, can be performed in response to the detection of one or more predefined conditions. For example, the processor 150 can be configured to perform block 210 in response to detecting an input from the input device 156 causing a barcode scan to be initiated, using the camera 158 or another capture device such as a barcode scanning module. When the device 132 is in use to assist in the performance of a picking task, e.g., by the worker 130, such an input may be received from the worker 130 to provide the above-noted confirmation that an item 108 has been picked.

Performing block 210 in response to an event such as the above-mentioned barcode scan input enables the device 132 to limit the processing of images via the method 200 to images that are likely to depict items 108 on the support structures. As will be apparent, if block 210 involves the selection of a particular image frame from a continuous sequences of images used for pose tracking or the like, some images may depict portions of the facility 100 other than the support structures 104, e.g., as the worker 130 moves between locations in the facility 100. Such images are less likely to be suitable for generating training data, and avoiding the processing of such images via the method 200 may therefore reduce the impact of training data generation on the computational resources of the device 132.

In some examples, at block 215 the device 132 can determine whether a confidence level associated with the pose determined at block 205 exceeds a threshold. Specifically, at block 215 the device 132 can select a particular one of the poses generated via block 205, coinciding in time with the capture of the image at block 210. Each pose generated via block 205 also includes a confidence level, and at block 215 the device 132 can compare the pose tracking confidence level to a threshold. When the confidence level is below the threshold, the accuracy of the pose determined at the time the image was captured is sufficiently low that subsequent processing of the image based at least partly on the device pose may yield insufficiently accurate results.

Therefore, when the determination at block 215 is negative, the device 132 can simply return to block 210, e.g., discarding the image captured at block 210 and awaiting capture of another image (with a further pose having been generated via block 205). When the determination at block 215 is affirmative, the device 132 proceeds to block 220. In other examples, block 215 can be omitted from the method 200.

At block 220, the device 132 is configured to detect at least one region of interest (ROI) in the image captured at block 210, and to determine the location of each ROI in the coordinate system 136 (i.e., the same coordinate system employed for pose tracking). The ROIs detected at block 220 are regions of the image that are likely to contain items 108. In other words, each ROI detected at block 220 includes a region such as a bounding box that encompasses a portion of the image that appears to depict an item 108. Of note, the detection of ROIs at block 220 does not result in the recognition of the items 108. That is, at block 220 no distinction is made by the device 132 between item types. The detection of ROIs in the image can be accomplished by executing a machine learning-based process, e.g., based on the detection mechanisms in the YOLO algorithm, or the like. In other examples, detection of ROIs at block 220 can be based on the detection of edges or other predefined image features indicative of items 108. As will be apparent to those skilled in the art, detection of ROIs is computationally simple in comparison with the recognition of items 108 within the ROIs.

Figure 3:
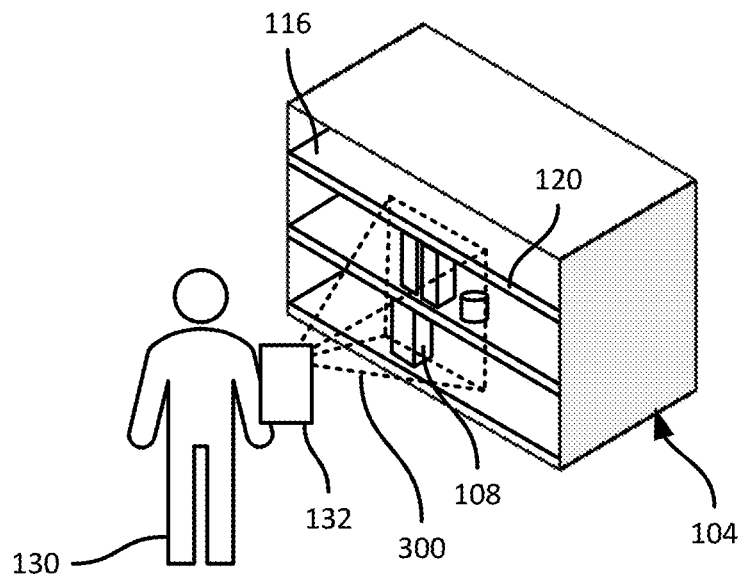
FIG. 3 is a diagram illustrating an example performance of blocks 210 and 220 of the method of FIG. 2.
Figure 3:
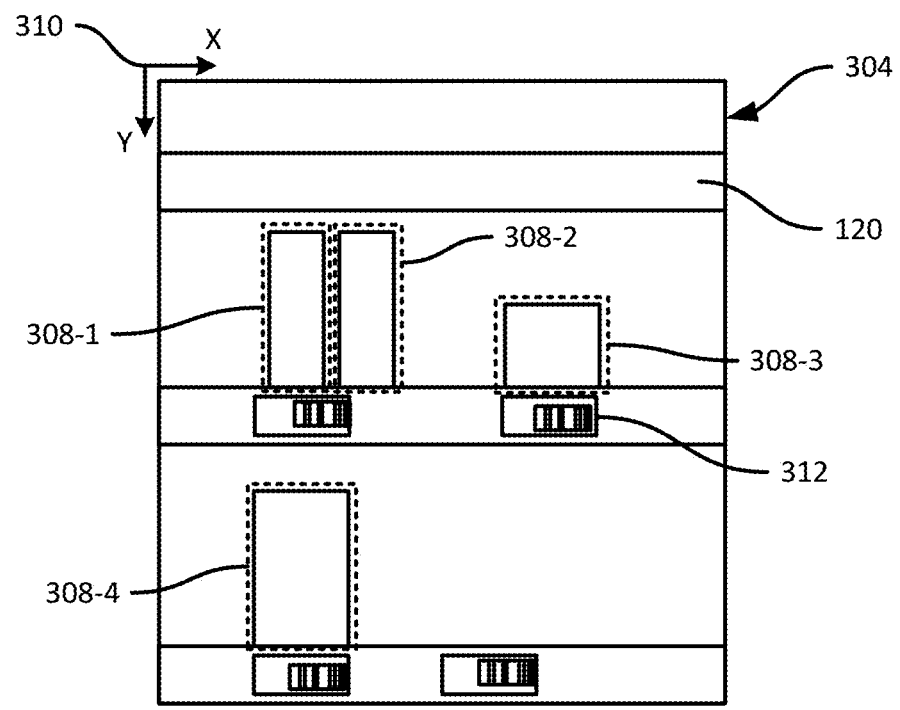

Turning to FIG. 3, an example performance of blocks 210 and 220 (assuming an affirmative determination at block 215, or the omission of block 215) is illustrated. In particular, the device 132 is shown being held by the worker 130 to direct a field of view (FOV) 300 of the camera 158 towards a support structure 104. The device 132 therefore captures an image 304 of the support structure 104 or a portion thereof, depicting various items 108, portions of the shelf edges 120, and the like.

The device 132 detects, at block 220, a set of regions of interest 308 likely to contain items 108. In particular, four ROIs 308-1, 308-2, 308-3, and 308-4 are shown as having been detected in FIG. 3. As will be apparent, various other numbers of ROIs can also be detected in the image 304, depending on the number of items 108 present in the image 304 and the successful detection of each item 108 (in some cases, lighting conditions or the like may result in certain items 108 not being detected). Each detected ROI 308 can be detected as a bounding box in a two-dimensional image coordinate system 310. For example, each ROI 308 can be defined by four pairs of coordinates, each corresponding to a respective corner of the ROI 308.

As shown in FIG. 3, the shelf edges 120 can also carry labels 314 including barcodes or other machine-readable indicia corresponding to the items 108. In some examples, the device 132 can also be configured to detect and decode (or otherwise extract data from) the machine-readable indicia, for later use in the method 200. Such detection and extraction can be performed at block 220, or at block 225, discussed further below.

Figure 4:
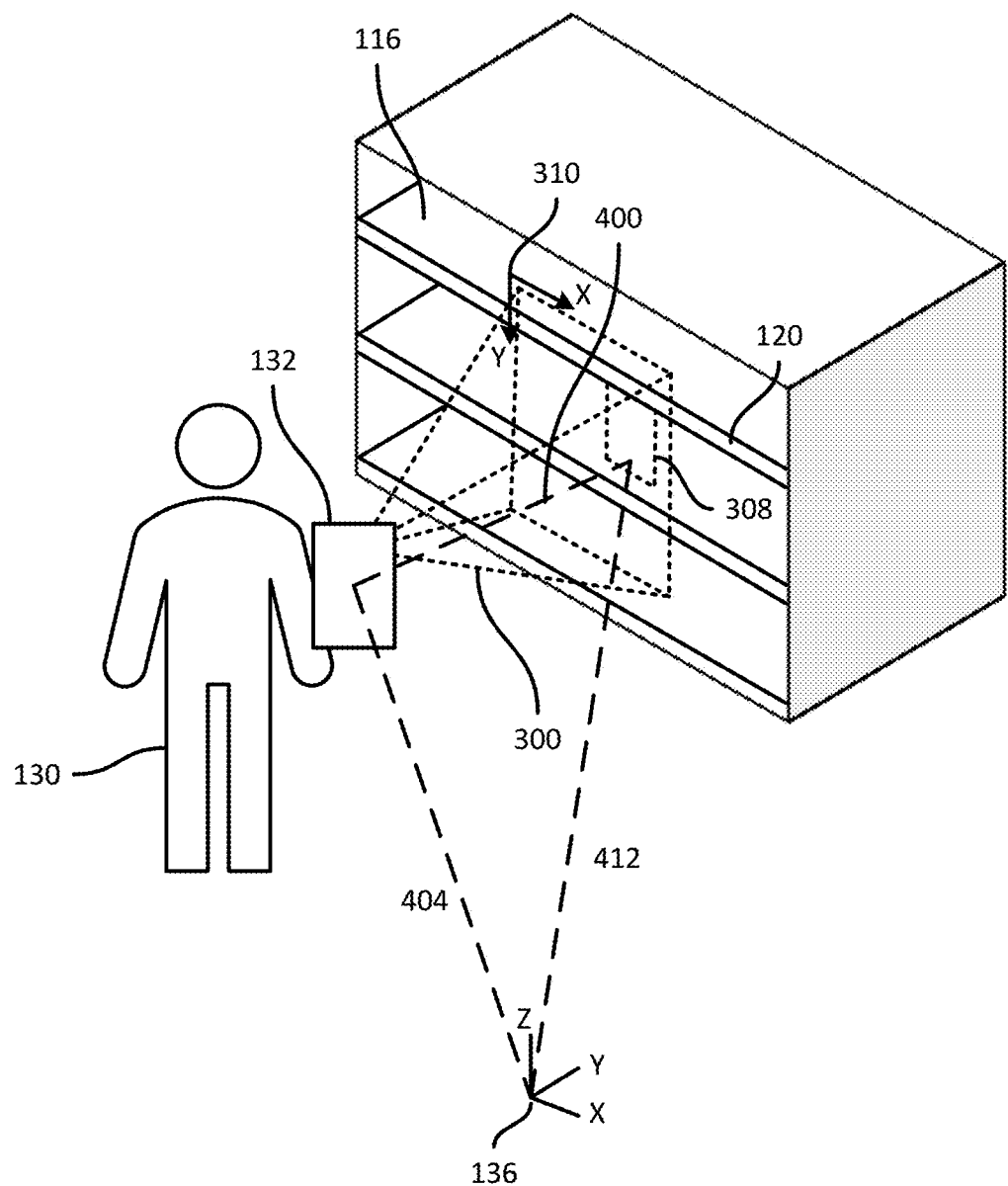
FIG. 4 is a diagram illustrating the determination of locations for regions of interest at block 220 of the method of FIG. 2.

As noted above, the device 132 is also configured to determine the locations of the ROIs 308 in the coordinate system 136 at block 215. Referring to FIG. 4, the determination of the locations of the ROIs 308 is illustrated, with the items 108 shown in FIG. 3 omitted, and a single ROI 308 shown for clarity.

Specifically, to convert the image coordinates of an ROI 308 (e.g., defined in the image coordinate system 310) to coordinates in the facility coordinate system 136, the device 132 can be configured to determine a location 400 of the ROI 308 relative to the device 132 itself. The location 400 is illustrated as a ray in FIG. 4, with the length and orientation of the ray relative to the device 132 defining the location 400. Determination of the location 400 can be performed using camera calibration data stored at the device 132, which specifies the position of the camera 158 relative to the device housing, as well as focal length and other relevant camera parameters. Using the location 400, and a pose 404 of the device 132 in the facility coordinate system 136, the device 132 can therefore determine a location 412 of the ROI 308 in the coordinate system 136. For example, the location of the ROI 308 in the facility coordinate system 136 can include sets of three-dimensional coordinates for each corner of the ROI 308. In other examples, the location of the ROI 308 in the facility coordinate system 136 can include a single coordinate, e.g., corresponding to a centroid of the ROI 308, which may be combined with a normal vector indicating the orientation of the ROI 308. There may be a delay (of several frame periods in some examples, or about 100 ms, although shorter and longer delays are also contemplated) between the time the image is captured at block 210, and the time at which block 220 is performed. The poses captured via block 205, as well as the images captured at block 210, are therefore timestamped, and when processing an image at block 220, the device 132 can therefore retrieve a pose having a matching timestamp (representing the contemporaneous pose of the device 132 at the time the image under processing was captured).

Returning to FIG. 2, having captured the image 304, and detected and located each of the ROIs 308, the device 132 is configured to perform a set of actions, bounded in FIG. 2 by a dashed box, for each of the ROIs 308. More specifically, the device 132 can be configured to repeat the actions shown in the dashed box in FIG. 2 until every ROI 308 has been processed.

In general, processing of the ROIs 308 via blocks 225 to 240 serves to obtain an item identifier corresponding to each ROI 308, and to use the obtained item identifier to automatically label a training data sample generated from the ROI 308. As will be seen below, the device 132 can also perform certain validation functions, to reduce the likelihood of generating incorrectly labelled training data samples.

At block 225, the device 132 is configured to obtain reference data corresponding to the ROI 308. The reference data includes at least an item identifier. In some examples, the reference data can also include certain attributes of the corresponding item. To obtain the reference data, the device 132 is configured to query the repository 140, e.g. by sending a request to the server 128. The request can include, for example, a location of the ROI 308 in the form of the above-mentioned coordinates, a centroid of the ROI 308 derived from the coordinates, or the like.

As noted above, the repository 140 contains a planogram and/or a realogram of the facility 100, indicating an idealized state of the facility 100. Thus, for each of a plurality of areas on the support structures 104 (e.g., referred to as facings), the repository 140 indicates which item 108 is expected to be present in the region. In response to the request, therefore, the server 128 can determine whether the location received from the device 132 corresponds to an area defined in the repository 140. When the location received from the device 132 does correspond to such an area, the server 128 retrieves the corresponding item identifier and provides the item identifier to the device 132.

Figure 5:
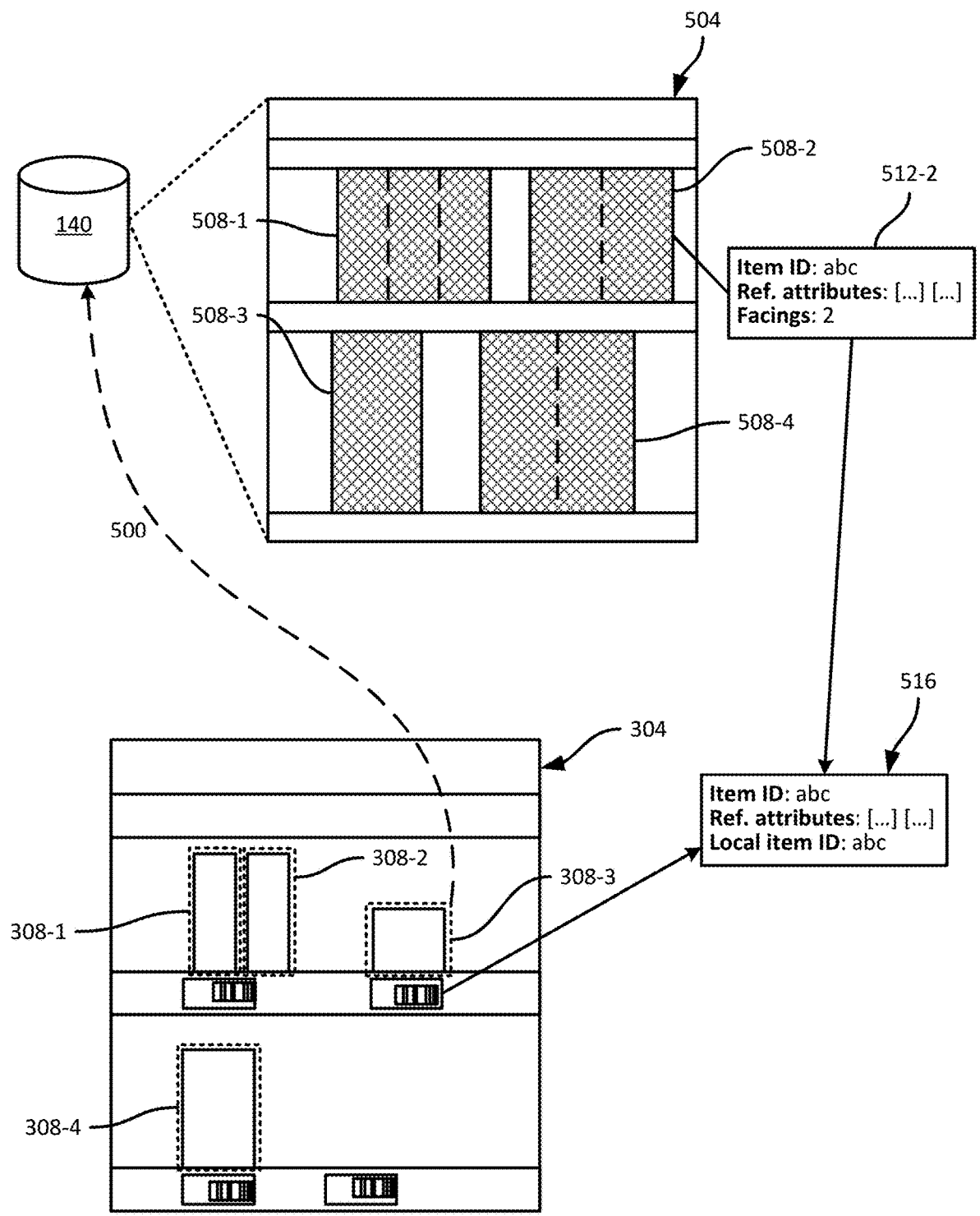
FIG. 5 is a diagram illustrating an example performance of block 225 of the method of FIG. 2.

Turning to FIG. 5, an example performance of block 225 is illustrated, for the ROI 308-3. In particular, the device 132 sends a query 500 to the repository 140 (e.g., to the server 128) containing a location of the ROI 308-3 in the facility coordinate system 136. The repository 140 contains a planogram 504 specifying a set of areas 508 (e.g., 508-1, 508-2, 508-3, and 508-4) in the facility 100, e.g., identified by coordinates in the coordinate system 136. Each area 508 is defined, in addition to its location, by the item 108 expected to be at the corresponding location. Thus, the repository 140 can also contain reference data 512 for each area 508, including an item identifier (e.g. "abc" in the illustrated example), and a number of facings of the corresponding item 108 that are expected to be within the corresponding area 508. In some examples, the reference data 512 can also include a set of reference attributes, derived from one or more previously captured images of the corresponding item 108. The reference attributes can include numerical vectors or the like, derived from such images. Examples of reference attributes can include color histograms, positions of detected features in such images (e.g., edges, corners), and the like. The reference attributes correspond to attributes employed by a recognition mechanism to detect the same item in subsequent images.

In response to the request 500, the device 132 receives the item identifier and, if present, the reference attributes, from the corresponding reference data 512. Thus, as shown in FIG. 5, the location of the ROI 308-3 overlaps substantially with the area 508-2, and the server 128 therefore returns to the device 132 the item identifier "abc" and the reference attributes stored in the repository 140 in connection with the area 508-2.

In some examples, the reference data obtained at block 225 can also include locally-derived reference data. For example, the device 132 can be configured to decode an item identifier from a barcode on the label 314 associated with the ROI 308-3 (e.g., by proximity to the ROI 308-3), for subsequent use as reference data. Reference data 516 obtained by the device 132 at block 225 can therefore include the item identifier and (if available) reference attributes from the repository 140, as well as a local item identifier obtained from a machine-readable indicium on a label 314.

Returning to FIG. 2, at block 230, the device 132 is configured to generate one or more attributes for the ROI 308, based on the image data contained within the ROI 308. That is, the device 132 can be configured to extract the ROI 308 from the image 304. Having extracted the ROI 308, the device 132 is configured to derive one or more attributes from the extracted ROI 308 (i.e., processing only the pixels within the extracted ROI 308, ignoring those from the remainder of the image 304). The attributes can be based on, as noted above, histograms, edges, corners, or any other suitable image feature detected in the extracted ROI 308. Features can be derived by various feature-detection mechanisms (also referred as keypoint detection), such as the Oriented FAST and Rotated BRIEF (ORB) feature detector. In general, the attributes generated at block 230 are expressed in the form of one or more numerical vectors referred to as descriptors, as will be apparent to those skilled in the art. In some instances, descriptors may have many (e.g., several hundred) dimensions. The device 132 can condense such descriptors via an embedding mechanism, as will be understood by those skilled in the art.

Figure 6:
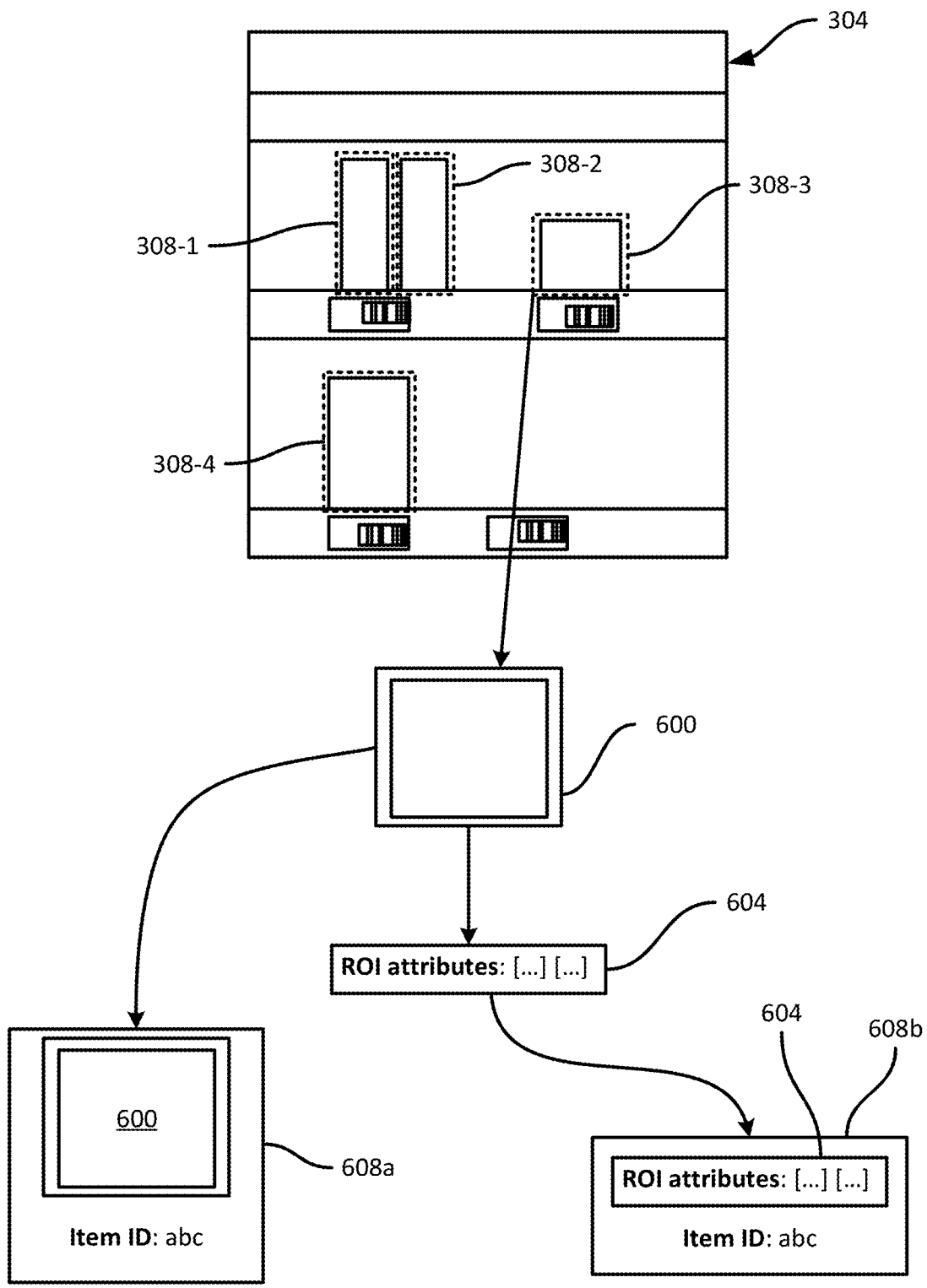
FIG. 6 is a diagram illustrating example output from the performance of blocks 230 and 240 of the method of FIG. 2.

FIG. 6 illustrates an example performance of block 230 of the method 200. In particular, the device 132 is configured to extract the ROI 308-3 from the image 304. Thus, attribute generation is performed only with respect to extracted image data 600, reducing the computational load of attribute generation, relative to the load associated with generating attributes for the entire image 304. From the extracted image data 600, the device 132 is configured to generate one or more attributes 604, such as the above-mentioned descriptor vectors and/or embeddings thereof.

Returning to FIG. 2, at block 235 the device 132 can be configured to validate the ROI 308-3 based on the attributes from block 230. In particular, the device 132 can compare at least one of the attributes from block 230 to a corresponding reference attribute obtained at block 225. The comparison can include, for example, determining a difference (e.g., a Euclidean distance) between a descriptor from block 230 and a corresponding reference descriptor from block 225. When the difference exceeds a preconfigured threshold, the determination at block 235 is negative, and when the difference does not exceed the threshold, the determination at block 235 is affirmative.

The validation at block 235 enables the device 132 to guard against the possibility that items 108 may be misplaced within the facility 100. Because training data samples are to be automatically labeled based on the expected item identifier at a particular location (sourced from the repository 140), if a different item 108 in fact appears at that location, the expected item identifier will not match the item 108 depicted in the ROI 308. The validation process at block 235 therefore seeks to detect when the ROI 308 exhibits image features that are sufficiently different from the image features expected to be present in the ROI 308 as to indicate a likely misplaced item 108.

When the determination at block 235 is negative, the ROI 308 is discarded, and no training data sample is generated from that particular ROI 308. When the determination at block 235 is affirmative, however, the device 132 proceeds to generate a training data sample at block 240.

Various other validation mechanisms at block 235 are also contemplated, and may be used in conjunction with or instead of the attribute comparison noted above. For example, in implementations in which the reference data obtained at block 225 includes a local item identifier, e.g., decoded from a label 312, as shown in FIG. 5, the device 132 can determine whether the local item identifier matches the item identifier received from the repository 140. As seen in the reference data 516 in FIG. 5, the item identifier from the repository 140 and the local item identifier do indeed match, resulting in an affirmative determination at block 235. A mismatch between the item identifier and the local item identifier may indicate that the repository 140 is out of date and no longer accurately reflects the expected item 108 at the location corresponding to the ROI 308.

At block 240, the device 132 is configured to generate a training data sample from the ROI 308. In particular, the device 132 is configured to label data derived from the ROI 308 with the item identifier obtained at block 225. FIG. 6 illustrates two example training data samples 608*a*, and 608*b*. The sample 608*a* includes a payload containing the extracted image data 600, as well as a label containing the item identifier obtained at block 225. The sample 608*b*, on the other hand, omits the image data 600 from the payload, and includes in its place the attributes 604 generated at block 230. The sample 608*b* is therefore generally smaller than the sample 608*a*, imposing smaller bandwidth and storage demands on the device 132 and the server 128. In other examples, the sample 608 can include both the extracted image data 600 and the attributes 604.

At block 245, once every ROI 308 detected at block 220 has been processed, and either discarded (via a negative determination at block 235) or used to generate a training data sample (via an affirmative determination at block 235), the device 132 is configured to transmit the training data samples to the server 128 or to another computing device hosting the previously mentioned recognition mechanism. After transmitting the training data samples, the device 132 can return to block 210 to capture a further image frame. In some examples, training data samples can be sent as they are generated, e.g. immediately upon generation at block 240. In further examples, training data samples can be sent in batches covering more than one image.

As will now be apparent, the receipt by the server 128 or other computing device of training data samples from a number of devices 132, within the facility 100 and/or other facilities, enables the server 128 to collect a large volume of training data. Further, the implementation of the method 200 by the device 132 (and other similar devices deployed in the facility 100) enables the device 132 to generate training data while the worker 130 is engaged in other tasks. The generation of training data can therefore occur while reducing the need to explicitly task the worker 130 with the collection of training data. In addition, the validation functions noted above reduce the incidence of mislabeled training data. The use of training data samples, in certain embodiments, that contain attributes derived from image data rather than the image data itself may further alleviate the computational load at the server 128 involved in processing the training data for use in generating or updating the recognition mechanism.

In some examples, rather than transmitting the training samples at block 245, or in addition to transmitting the training samples, the device 132 can use the training samples locally, e.g., maintaining the training samples in the memory 152 and using the training samples to generate an image classification model (i.e., to train the above-mentioned recognition mechanism). For example, the application 168 or another application stored in the memory 152 can include instructions executable to process locally stored training samples to generate the image classification model.

Variations to the above functions are contemplated. The ROIs 308 can depict items other than products in a retail facility, in other embodiments. For example, in some embodiments the method 200 can be employed to collect training data samples representing the labels 312, or other features in the facility 100, in addition to or instead of the items 108. The repository 140 may also contain data specifying the expected locations and content of other features such as the labels 312.

In some examples, the labeling of training data samples can be achieved without contact to the repository 140, e.g. by detecting and decoding a barcode or other machine-readable indicium on a label 312, and labeling a sample directly with the local item identifier.

In further embodiments, the device 132 can perform ROI detection and locationing at block 220 for more than one image at a time. In particular, as noted earlier the pose tracking initiated at block 205 can include capturing and analyzing a stream of images, e.g. via the camera 158. Analysis of such images includes the detection of features (e.g., corners, surfaces, etc.) that can be identified in subsequent images, to track the movement of the device 132. The device 132 can be configured to also detect potential ROIs during such analysis, which may represent items 108. For instance, the worker 130 may remove the item 108 in order to scan a barcode on the item 108 to confirm a pick. The location of the item 108 at the time of the barcode scan, in other words, is no longer the correct reference location.

The device 132 can therefore, in response to detecting an input such as a barcode scan command, not only select an image taken at the time of the barcode scan (or other suitable input) at block 210, but also select one or more previous images from the above-mentioned stream. The previous images can include any images in the stream that include the same detected ROI (e.g., the same bounding box corresponding to an item 108). On the assumption that the first detection of the ROI preceded the removal of the item 108 from the support structure 104, the device 132 is configured to determine a location of the ROI from that image, based on an earlier tracked pose that coincides with that image in time.

Figure 7:
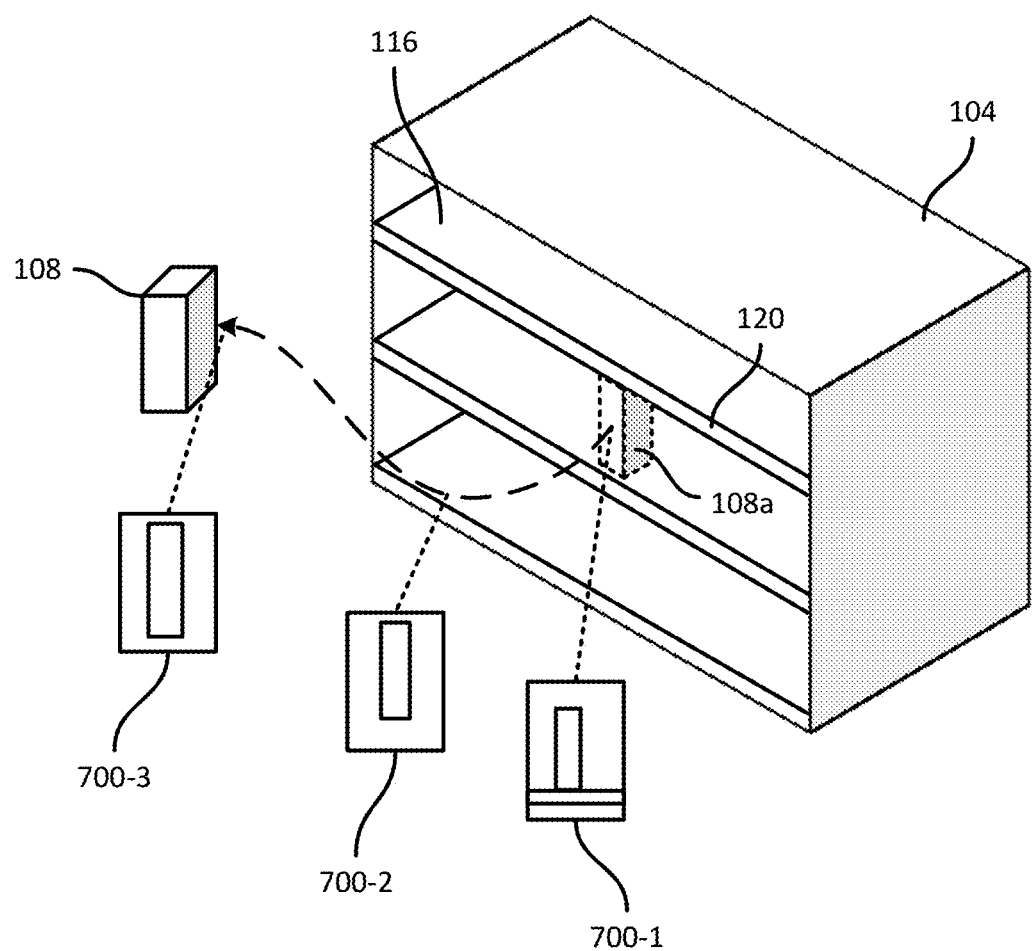
FIG. 7 is a diagram illustrating another example performance of the method of FIG. 2.

FIG. 7 illustrates an example of the above embodiment. In particular, the device 132 receives a barcode scan input for an item 108, and selects an image 700-3 from the above-mentioned stream. The item 108 is depicted in the image 700-3 and detected as an ROI. However, the location associated with the image 700-3 does not align with the reference data in the repository 140. The device 132 can therefore be configured to traverse previously captured images, e.g., 700-2, and 700-1, until the first image in the stream that depicts the same ROI (in this example, the image 700-1, which depicts an original position 108*a* of the item 108 on the support structure 104). The device 132 determines a location of the ROI in the image 700-1, and obtains reference data at block 225 based on that location.

The device 132 can then generate ROI attributes and, if those attributes are valid, generate a training sample for each of the images 700-1, 700-2, and 700-3. Specifically, the same reference attributes (e.g., the same item identifier) can be used to label each image 700.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a mobile computing device, the method comprising:
    controlling a camera to capture an image;
    tracking a pose of the mobile computing device, corresponding to the image, in a coordinate system;
    detecting an item in the image;
    determining a location of the detected item in the coordinate system, based on the tracked pose;
    obtaining an item identifier corresponding to the detected item, based on the location of the detected item in the coordinate system;
    generating a training data sample including (i) a payload based on the detected item, and (ii) a label including the obtained item identifier;
    storing the training data sample;
    extracting a region of interest (ROI) containing the detected item from the image;
    generating an attribute from the ROI; and
    prior to generating the training data sample: (a) obtaining a reference attribute, and (b) determining that a difference between the reference attribute and the attribute is smaller than a threshold.

2. The method of claim 1, further comprising: sending the training data sample to a further computing device, for generation of an image classification model based on the training data sample.

3. The method of claim 1, further comprising: generating, at the mobile computing device, an image classification model based on the training data sample.

4. The method of claim 1, wherein obtaining the item identifier includes sending a request containing the location, and receiving the item identifier in response to the request.

5. The method of claim 4, wherein sending the request includes sending the request to a server hosting a repository containing item identifiers and respective locations.

6. The method of claim 1, further comprising:
    generating the payload of the training data sample by labeling the extracted ROI with the item identifier.

7. The method of claim 1, further comprising:
    generating the payload of the training data sample by labeling the attribute with the item identifier.

8. The method of claim 1, wherein the attribute includes a numerical feature derived from the extracted ROI.

9. The method of claim 1, further comprising:
    detecting a machine-readable indicium in the image;
    decoding a local item identifier from the machine-readable indicium; and determining that the local item identifier and the obtained item identifier match.

10. The method of claim 1, further comprising:
prior to detecting the item, determining that a confidence level associated with the pose of the mobile computing device meets a second threshold.

11. The method of claim 1, further comprising:
selecting a previous image containing the detected item;
determining a location of the detected item in the coordinate system from the previous image;
generating first and second training data samples based on the image and the previous image, each of the first and second training data samples having a label including the obtained item identifier.

12. A mobile computing device, comprising:
a camera;
a memory; and
a processor configured to:
control the camera to capture an image;
track a pose of the mobile computing device, corresponding to the image, in a coordinate system;
detect an item in the image;
determine a location of the detected item in the coordinate system, based on the tracked pose;
obtain an item identifier corresponding to the detected item, based on the location of the detected item in the coordinate system;
generate a training data sample including (i) a payload based on the detected item, and (ii) a label including the obtained item identifier;
store the training data sample;
extract a region of interest (ROI) containing the detected item from the image;
generate an attribute from the ROI; and
prior to generating the training data sample: (a) obtain a reference attribute, and (b) determine that a difference between the reference attribute and the attribute is smaller than a threshold.

13. The mobile computing device of claim 12, further comprising: sending the training data sample to a further computing device, for generation of an image classification model based on the training data sample.

14. The mobile computing device of claim 12, further comprising: generating, at the mobile computing device, an image classification model based on the training data sample.

15. The mobile computing device of claim 12, wherein, to obtain the item identifier, the processor is configured to send a request containing the location, and receive the item identifier in response to the request.

16. The mobile computing device of claim 15, wherein the processor is configured to send the request to a server hosting a repository containing item identifiers and respective locations.

17. The mobile computing device of claim 12, wherein the processor is further configured to:
generate the payload of the training data sample by labeling the extracted ROI with the item identifier.

18. The mobile computing device of claim 12, wherein the processor is further configured to:
generate the payload of the training data sample by labeling the attribute with the item identifier.

19. The mobile computing device of claim 12, wherein the attribute includes a numerical feature derived from the extracted ROI.

20. The mobile computing device of claim 12, wherein the processor is further configured to:
detect a machine-readable indicium in the image;
decode a local item identifier from the machine-readable indicium; and
determine that the local item identifier and the obtained item identifier match.

21. The mobile computing device of claim 12, wherein the processor is further configured to:
prior to detecting the item, determine that a confidence level associated with the pose of the mobile computing device meets a second threshold.

22. The mobile computing device of claim 12, wherein the processor is further configured to:
select a previous image containing the detected item;
determine a location of the detected item in the coordinate system from the previous image;
generate first and second training data samples based on the image and the previous image, each of the first and second training data samples having a label including the obtained item identifier.

23. A non-transitory computer-readable medium storing computer-readable instructions executable by a processor of a mobile computing device to:
control a camera to capture an image;
track a pose of the mobile computing device, corresponding to the image, in a coordinate system;
detect an item in the image;
determine a location of the detected item in the coordinate system, based on the tracked pose;
obtain an item identifier corresponding to the detected item, based on the location of the detected item in the coordinate system;
generate a training data sample including (i) a payload based on the detected item and (ii) a label including the obtained item identifier;
store the training data sample;
extract a region of interest (ROI) containing the detected item from the image;
generate an attribute from the ROI; and
prior to generating the training data sample: (a) obtain a reference attribute, and (b) determine that a difference between the reference attribute and the attribute is smaller than a threshold.

* * * * *